Figure 1:
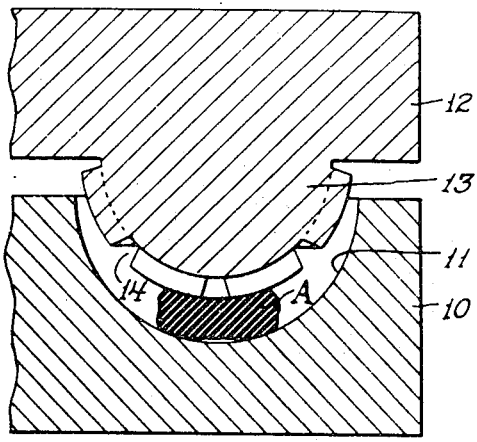

Aug. 13, 1940.                F. T. ROBERTS                2,210,954
METHOD OF MAKING TENNIS BALLS
Filed Nov. 24, 1936                    2 Sheets-Sheet 1

INVENTOR.
Fred T. Roberts
BY Bates, Goldrick McLean
ATTORNEYS.

Patented Aug. 13, 1940

2,210,954

UNITED STATES PATENT OFFICE 2,210,954

METHOD OF MAKING TENNIS BALLS

Fred T. Roberts, Malone, N. Y., assignor to Albert H. Bates, Shaker Heights, Ohio Application November 24, 1936, Serial No. 112,572

18 Claims. (Cl. 154—16)

This invention relates to a method of making tennis balls or similar articles and comprises a continuation in part of my pending application No. 692,388, filed October 6, 1933, for a Rubber ball and method of making the same, but now confined to a rubber ball.

The object of the present invention is to provide for the economical manufacture of a rubber ball which shall be very resilient and shall be capable of long life without material diminution of such resilience.

The invention is especially well adapted for the manufacture of tennis balls, which must be of a certain size and of very light weight and have a high resilience. Heretofore the custom has been to make such tennis balls inflated by compressed air. Experience has shown that such balls do not maintain their original internal pressure, there being a gradual loss of such pressure, which may be due to leakage or to chemical reaction of the contained air with the constituents of the rubber wall. Whatever the cause, it is a well-known fact that tennis balls become less and less resilient, until, in a comparatively short time, they cease to be satisfactory for use in the game.

I have discovered that in place of relying upon a high degree of internal fluid pressure, stretching the rubber wall, I can accomplish a much more permanent resilience by compressing the ball from the exterior by winding it with stretched rubber strands. Such stretched rubber strands have been heretofore used on heavy rubber centers for golf balls, but it is not feasible to use such a heavy center in a tennis ball, as the ball would be entirely too heavy for such use. On the other hand, if an ordinary rubber ball having a thin wall corresponding to that used in the construction of tennis balls were wound with the external rubber strands, it would be necessary for the rubber ball to be inflated with some fluid pressure to resist the compressive action of the strands.

Such a ball would be an improvement over the present tennis ball for the two reasons that the internal pressure tending to cause leakage would be reduced, and the stretching of the wall by the internal pressure would be reduced, and hence, tendency of the pores of such wall to be opened and allow leakage would be less than in the present standard practice. Accordingly, a tennis ball having a thin wall rubber center with a comparatively small internal fluid pressure and with an external winding of stretched strands compressing the rubber of the ball is an advance in this art and is included within my broad invention.

However, I have discovered that I can make a light rubber ball suitable for external winding without requiring internal pressure, by forming ribs on the interior wall of the ball, these ribs only slightly increasing the weight but acting as braces to prevent the collapsing of the ball as it is wound. Such a ball is an improvement on the plain-walled ball wound with strands, and is likewise included within my invention.

Finally, I have found that I can obtain the very best results by making the ribs originally on the exterior of the halves of the ball and turning these halves inside out, thereby compressing the ribbed structure before the halves are secured together. When such a ball is wound with external strands of rubber stretched almost to their elastic limit, and then covered with felt, cemented in place, there results the best tennis ball at present known to me, and the method of making such ball is also covered by this patent.

In my method of manufacture, I prefer to form the ball as a closed sphere with internal ribs integral with the wall and forming a network on the interior thereof sufficient to brace the wall for a substantial contraction, and then I wind the ball with rubber strands stretched almost to their elastic limit. This winding materially compresses the ball so that the wound ball is no larger in diameter than the unwound ball. I then cover the wound ball with the usual felt covering and I thus produce a tennis ball which has the proper size and weight and a resilience independent of the maintenance of internal pressure.

The rubber ball forming the core of the tennis ball is by my method made in two hemispherical halves joined by an equatorial seam. The halves may be died out with the ribs on the interior, though, as heretofore mentioned, I prefer making the ribs on the exterior and then introvert each half so that the ribs become internal and are thereby compressed and provide an increased bracing action by reason of such compression.

Taking such a ball, as just described, with its internal ribs and preferably with internal air at merely atmospheric pressure, I proceed to wind the ball with thin, highly stretched rubber strands. These strands extend in every direction about the ball and completely cover it for a thickness preferably somewhat less than the thickness of the rubber wall itself. This winding reduces the size of the rubber ball proper sufficiently so that the external diameter including the strands, is the same as that of the molded ball.

The halves of the molded ball, when died out, are vulcanized somewhat short of completion, but sufficiently so that the halves retain their hemispherical shape—either the original hemisphere if the ribs are formed on the interior, or the introverted hemisphere if the ribs are formed on the exterior. When the two halves are cemented together they are given a further vulcanization, merely sufficient to set the cement. Then, after the rubber strands are applied, the cover is cemented about the exterior with rubber cement, and then the finished ball is revulcanized to set the cement and at the same time complete the vulcanization of the interior ball. The final result is a ball of the weight and size provided in the tennis regulations, but with unusually high resilience which continues indefinitely without diminution.

My method of construction constituting this present invention is illustrated in the drawings hereof and is hereinafter more fully described and is summarized in the claims.

Figure 2:
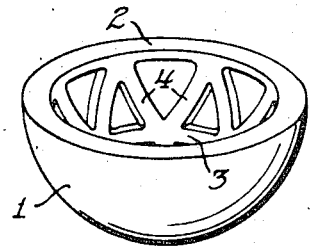
Figure 3:
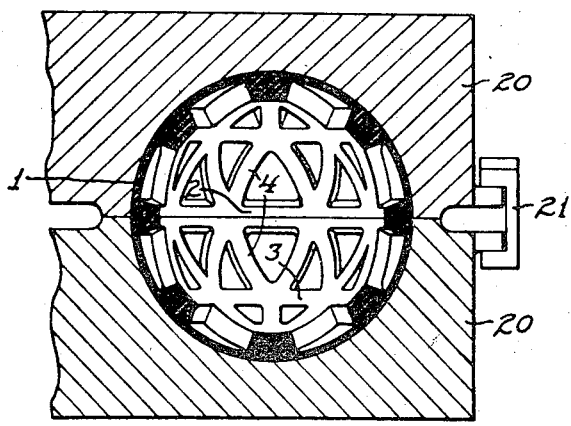
Figure 4:
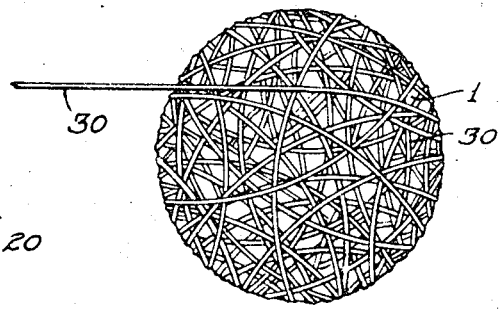
Figure 5:
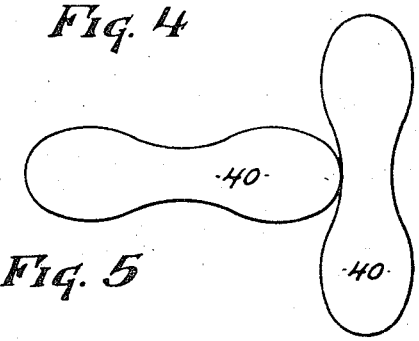
Figure 6:
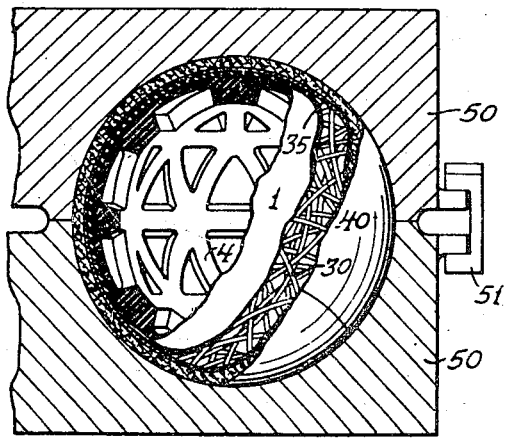
Figure 7:
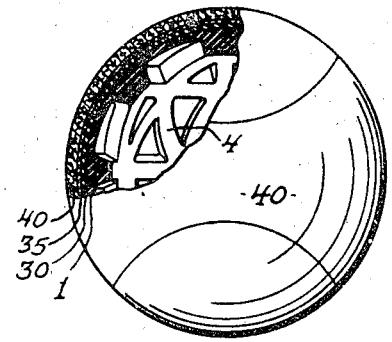
Figure 8:
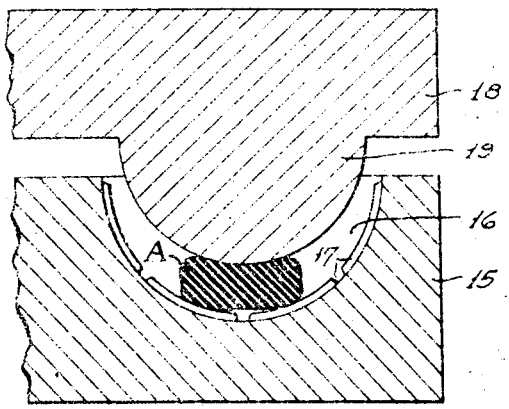
Figure 9:
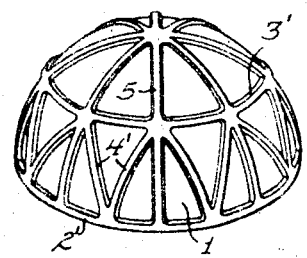
Figure 10:
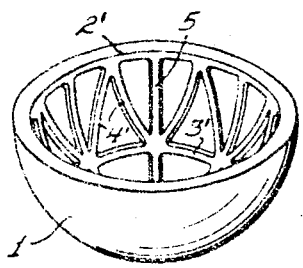
Figure 11:
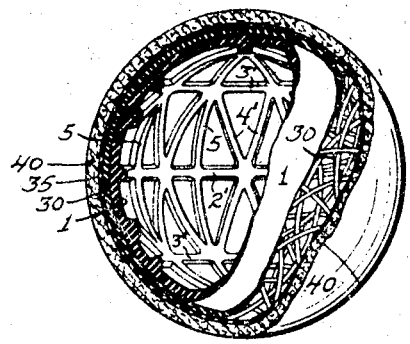

In the drawings, Fig. 1 illustrates a pair of dies adapted to form a hemispherical section with ribs made directly on the interior; Fig. 2 is a perspective of the section produced by the dies of Fig. 1; Fig. 3 is a view showing a vulcanizing mold having a spherical cavity in which two of the halves shown in Fig. 2 are mounted in abutting relation; Fig. 4 is a view illustrating the winding of the rubber strands on the ball produced in the mold of Fig. 3; Fig. 5 is a somewhat diagrammatic view illustrating the felt coverings which are placed on the ball of Fig. 4 after the winding thereof has been completed, the edges of these coverings being brought together and cemented; Fig. 6 is a view illustrating the final vulcanizing mold containing the completed ball made by the preceding steps; Fig. 7 is a view of the completed ball itself as removed from the final vulcanizing mold but partly broken away to illustrate the interior; Fig. 8 is a view of an original die mold which forms the ribs on the exterior of the ball; Fig. 9 is a view of the hemisphere produced by the mold of Fig. 8; Fig. 10 is a view of the hemisphere of Fig. 9 after it has been introverted; Fig. 11 is a view of the wound, covered and completely vulcanized ball produced by the two hemispheres of Fig. 10. The ribs shown in Figs. 9 to 11 are smaller and somewhat differently arranged from those of Figs. 2, 3, 6 and 7.

Each half of the ball shown in Figs. 2 and 10 comprises an external hemispherical wall 1 and internal ribs so arranged that the interior is divided into spherical triangles. There is one annular equatorial rib 2 at the edge of the hemisphere and preferably another parallel rib 3 between the equator and the pole.

Diagonal ribs 4 may complete the network of ribs, as in Figs. 2, 3, 6 and 7, or there may be still other ribs extending as true meridians from the pole, as shown at 5 in Figs. 9, 10 and 11. In the latter embodiment, the ribs 2', 3' and 4' are preferably smaller in cross-section than the corresponding ribs of Figs. 2, 3, 4 and 7. In either form shown, the ribs divided the entire surface into spherical triangles.

The exact form of ribs may be varied from that illustrated, the important point being that the ribs are so arranged as to form sufficient braces for the entire surface of the ball, so that at no point can it be materially collapsed by the rubber winding.

If the hemisphere is to be originally made with the ribs on the interior, I prefer to use such a forming mold as illustrated in Fig. 1, where 10 indicates one member having a plain hemispherical cavity 11 and 12, the other member with a substantially hemispherical projection 13, which, however, now has grooves 14 to form the ribs. "A" in Fig. 1 indicates a piece of raw rubber which is placed in the mold cavity 11; then when the mold members are brought together this rubber assumes the form shown in Fig. 2 and is caused to maintain that form by an incomplete cure—perhaps half or three-fourths of the complete cure.

If the ball hemispheres are to be formed in the first instance with the ribs external, then I prefer to employ the mold of Fig. 8, where the cavity 15 mold 15 has a substantially hemispherical cavity 16, but with a network of grooves 17 to provide for the ribs and the projection 19 on the mold member 18 is purely hemispherical. Such a mold, when closed on the raw rubber "A", produces the structure of Fig. 9, which, when introverted, becomes the internally ribbed hemisphere of Fig. 10.

Two hemispheres with ribs on the interior, whether originally so made or made externally and then introverted, are placed in a two-part vulcanizing mold. Such mold is illustrated in Fig. 3, comprising two members 20, each having a hemispherical cavity. Two hemispheres being placed in the respective cavities, the mold members are brought together and clamped as by a clamp 21 and sufficient heat applied to set the equatorial seam which has been first cemented. The extent of this vulcanization is comparatively slight, and leaves the article still incompletely vulcanized.

In placing the two hemispheres in the vulcanizing mold, the ribs terminating at the equatorial rib may be caused to register in the two halves as illustrated in Fig. 3, or the ribs of one-half may be offset from those of the other without detriment to the ball, as I find it is well braced, whether the ribs register or not.

When the vulcanizing mold 20 is opened and the closed ball removed, it is then wound in every direction with stretched rubber strands 30 until it is entirely covered. For clearness of illustration, Fig. 4 shows the ball as it appears during the process of such winding and before it has been completely covered. I find it very satisfactory to use a strand of quite narrow width before it is stretched and to stretch this substantially to the elastic limit, so that the width is materially narrower than it was originally. The winding is effected while the ball center is in a suitable machine which turns it about every possible axis so that the strands extend in every direction until the entire surface of the ball is covered.

After the ball has been wound with the stretched strands, their tension has compressed the entire ball structure so that notwithstanding the thickness of the winding the wound ball has no greater diameter than the unwound ball. After the ball has been so wound, it is covered with cement (indicated at 35 in Figs. 6, 7 and 11) and the felt covers, indicated at 40 in Figs. 5, 6, 7 and 11, are applied, and cemented in place, with the edges of the two cover pieces snugly engaging in the usual manner of covering a tennis ball.

The covered ball is now placed in a final vulcanizing mold, indicated in Fig. 6, comprising two members 50 having hemispherical cavities of the proper size for the finished ball. These members are clamped together, as by a clamp 51, and then heated for a sufficient time to set the rubber cement between the cover and winding and to complete the vulcanization of the ball center without over-vulcanizing the rubber strands. The final result is the ball shown in Figs. 7 or 11.

It will be noticed that the vulcanization is accomplished in three stages—first the partial curing of the hemispheres. This must be sufficient to make the hemispheres hold their shape and for sufficient rigidity against collapse. This action is commonly called "semi-curing," though the hemispheres may be more than half cured—perhaps three-quarters cured. The second vulcanization is of short duration but is sufficient to set the cement at the diametric seam joining the two halves. The third vulcanization is also comparatively slight, but I find can be better accomplished by less heat and longer time. It is sufficient to set the cement over the entire interior of the felt covering and complete the vulcanization of the center. The rubber strands when wound may be slightly under-vulcanized, though vulcanized sufficiently to have the proper resilience, and thus the final vulcanization step gives the desired amount of vulcanization to the rubber center, the windings and the cement.

Without limiting myself to specific sizes, I may state that very satisfactory results have been obtained by my process in providing balls meeting present day tennis requirements of 2¼ inches diameter and a weight not to exceed two ounces, by using the following dimensions:

I make the original molded rubber ball of substantially 2 1/16 inches in external diameter with a thickness of wall of approximately 1/16 of an inch and internal ribs of from 1/8 to 1/16 of an inch in thickness. I take strands of rubber about 1/64 of an inch thick and 1/16 of an inch wide and twenty-five feet long and stretch them to about four times their regular length or to approximately one hundred feet in length. I wind about one hundred and fifty turns of these stretched strands about the ball, while it is being turned about every axis, with the result that the winding is about 1/32 of an inch thick, but it has compressed the ball sufficiently so that the external diameter of the rubber ball plus the winding is still 2 1/16 inches in diameter. I use for the cover felt of approximately 1/8 of an inch in thickness with the result that the final ball has a diameter of 2¼ inches thickness, which is the standard diameter for a tennis ball at the present time. Such ball will weigh substantially two ounces.

The time and heat of vulcanization will vary greatly depending upon the amount of accelerator in the rubber. I have, however, produced satisfactory results with standard rubber mixtures by submitting the dies containing the formed halves for five minutes to a temperature resulting from seventy-five pounds of steam pressure; the second vulcanization, setting the diametric seam, for three minutes at seventy-five pounds, and the final vulcanization from six to ten minutes with twenty pounds of steam.

I claim:

1. The method of making hollow balls comprising forming a closed center with a relatively thin rubber wall braced at intervals on the interior, winding the exterior of the ball with rubber strands under tension and placing a cover over the wound ball.

2. The method of making tennis balls comprising forming a closed rubber ball with a relatively thin wall and rubber braces on the interior, and winding the exterior of the ball with rubber strands tensioned sufficiently to compress the ball so that the exterior diameter of the wound ball is no greater than that of the molded rubber ball.

3. The method of making balls comprising taking two hollow hemispheres with ribs on the interior, securing such hemispheres together to form a complete sphere internally braced, winding the exterior of such sphere with stretched rubber strands and then cementing a cover on the wound ball.

4. The method of making balls comprising taking hollow partly-cured rubber hemispheres with ribs on the interior, abutting such hemispheres, cementing and vulcanizing together to form a complete sphere internally braced, winding the exterior of such sphere with rubber strands stretched nearly to their elastic limit, cementing a cover on the wound ball, and finally vulcanizing the complete ball.

5. The method of making balls comprising making hollow hemispheres of rubber, each with a network of ribs on its interior, comprising ribs extending laterally and from the poles in a manner to divide the wall space substantially into spherical triangles, securing two of such hemispheres together to make a complete sphere, winding such sphere with thin rubber strands tensioned almost to the elastic limit, whereby the radius of the sphere is reduced by an amount at least as great as the radical dimension of the applied winding, then cementing a fabric cover on the wound ball and finally vulcanizing the wound and covered ball to set the cement and complete the vulcanization of the interior.

6. The method of making a hollow rubber ball, comprising forming complementary halves, curing said halves sufficiently to produce a permanent set in the rubber, turning the halves inside out, joining the free edges of the halves, and thereafter wrapping the exterior of the ball with thin rubber bands.

7. The method of making rubber balls comprising pressing out hemispheres with ribs on the exterior, semi-curing them, introverting the halves to bring the ribs on the interior, vulcanizing the two halves together, winding the exterior of the ball with thin and narrow stretched rubber strands, cementing a fabric cover over the wound ball and vulcanizing the completed article.

8. The method of making balls comprising making hollow partly-cured hemispheres of rubber, each with ribs on its exterior, introverting such hemispheres, securing two of such introverted hemispheres together to make a complete sphere, winding such sphere with thin rubber strands tensioned almost to the elastic limit, whereby the radius of the sphere is reduced by an amount at least as great as the radial dimension of the applied winding, then cementing a fabric cover on the wound ball and finally vulcanizing the wound and covered ball to set the cement and complete the vulcanization of the interior.

9. The method of making a hollow spherical rubber ball, comprising molding complementary halves with external triangularly spaced ribs thereon, curing said halves sufficiently to produce a permanent set in the rubber, turning said halves inside out and joining their free edges to form a complete sphere, thereafter compressing said sphere by tightly wrapping the exterior thereof with thin rubber strands under tension and applying a cover over the wound ball.

10. The method of forming a hollow rubber ball, comprising molding complementary halves with external latitudinal and diagonal intersecting ribs thereon, partially curing said halves, turning the halves inside out, cementing their edges and vulcanizing the two halves together with a slight vulcanization, thereafter wrapping the exterior of the ball with thin, narrow rubber strands stretched substantially to the elastic limit, then cementing to the exterior of the wound ball a felt cover, and finally vulcanizing the entire article sufficiently to set the last applied cement and complete the vulcanization of the rubber interior without over-vulcanizing the rubber strands.

11. The method of manufacturing hollow rubber balls, comprising forming them in sections with ribs on the exterior and turning the sections inside out and joining them.

12. The method of manufacturing hollow rubber balls, comprising forming two cup-like halves each with meridian ribs on its exterior, then turning the sections inside out, then securing them together with the ribs in registration.

13. The method of manufacturing hollow rubber balls, comprising forming two cup-like halves each with meridian ribs on its exterior, then turning the sections inside out, then placing the sections in vulcanizing mould members, bringing the members together with the ribs in registration, and then vulcanizing the article.

14. The method of making hollow rubber balls, comprising forming by pressure hollow hemispheres with ribs on the exterior, semi-curing such hemispheres, then turning the moulds in position so that the ribs will register, then bringing the vulcanizing moulds together, and submitting them to heat sufficient to complete the curing.

15. The method of making hollow rubber balls, comprising forming cup-shaped halves, curing them sufficiently to cause them to retain their form, then turning the halves inside out and securing them together.

16. The method of making a hollow rubber ball, comprising molding complementary halves with external ribs thereon, curing said halves sufficiently to produce a permanent set in the rubber, turning the halves inside out and joining their free edges while completing the curing, and thereafter tightly wrapping the exterior of said ball with rubber bands.

17. The method of forming a hollow rubber ball, comprising molding complementary halves with external meridional, latitudinal and diagonal intersecting ribs thereon, completely curing said halves, turning the halves inside out, joining their free edges of curing, and thereafter tightly wrapping the exterior of said ball with rubber bands.

18. The method of making a tennis ball comprising taking a hollow rubber sphere having a thin intrinsically collapsible wall, and having internal means additional to the wall to resist collapsing of the sphere as a whole, the hollow diameter of the sphere being many times that of the thickness of the wall, externally compressing such wall by means of stretched rubber strands wound about the exterior while the wall is prevented from collapsing by the means in the interior thereof and until the wall is compressed so that the external diameter of the wound ball is no greater than that of the original formed ball, and securing a cover over the wound ball.

FRED T. ROBERTS.

CERTIFICATE OF CORRECTION.

Patent No. 2,210,954. August 13, 1940.

FRED T. ROBERTS.

It is hereby certified that error appears in the printed specification of the above numbered patent requiring correction as follows: Page 3, second column, line 32, for "radical" read --radial--; page 4, second column, line 21, claim 17, for "of" read --by--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.